United States Patent
Hu

(10) Patent No.: US 9,475,257 B2
(45) Date of Patent: Oct. 25, 2016

(54) THREE DIMENSIONAL NEGATIVE POISSON'S RATIO SPACER KNITTED FABRIC AND METHOD FOR MAKING THE SAME

(75) Inventor: Hong Hu, Hong Kong (HK)

(73) Assignee: THE HONG KONG RESEARCH INSTITUTE OF TEXTILES AND APPAREL LIMITED, Hong Kong (HK)

( * ) Notice: Subject to any disclaimer, the term of this patent is extended or adjusted under 35 U.S.C. 154(b) by 362 days.

(21) Appl. No.: 14/239,255

(22) PCT Filed: Sep. 14, 2012

(86) PCT No.: PCT/CN2012/081390
§ 371 (c)(1),
(2), (4) Date: Feb. 17, 2014

(87) PCT Pub. No.: WO2013/127168
PCT Pub. Date: Sep. 6, 2013

(65) Prior Publication Data
US 2014/0205795 A1    Jul. 24, 2014

(30) Foreign Application Priority Data
Feb. 28, 2012 (CN) .......................... 2012 1 0047717

(51) Int. Cl.
*D04B 21/10* (2006.01)
*B32B 3/12* (2006.01)
(Continued)

(52) U.S. Cl.
CPC ................. *B32B 5/026* (2013.01); *B32B 3/12* (2013.01); *B32B 5/028* (2013.01); *B32B 5/26* (2013.01); *D04B 21/10* (2013.01); *D04B 21/14* (2013.01); *D04B 21/20* (2013.01); *D06C 7/00* (2013.01); *D06C 15/00* (2013.01);

*B32B 2250/03* (2013.01); *B32B 2250/20* (2013.01); *B32B 2250/40* (2013.01); *B32B 2262/0253* (2013.01);
(Continued)

(58) Field of Classification Search
CPC ...... D04B 21/10; D04B 21/14; D04B 21/20; D06C 7/00; D06C 15/00
USPC ......................................................... 442/312
See application file for complete search history.

(56) References Cited

U.S. PATENT DOCUMENTS

| 2003/0106346 | A1* | 6/2003 | Matsumoto ............ D04B 21/10 |
| | | | 66/195 |
| 2008/0011021 | A1 | 1/2008 | Starbuck et al. |
| 2011/0046715 | A1 | 2/2011 | Ugbolue et al. |

FOREIGN PATENT DOCUMENTS

| WO | 2008016690 | 2/2008 |
| WO | 2009002479 | 12/2008 |
| WO | 2010125397 | 11/2010 |

*Primary Examiner* — Jenna Johnson

(57) ABSTRACT

This present application relates to a three dimensional negative Poisson's ratio spacer knitted fabric and a method for making the same; the fabric includes a first surface layer fabric, a second surface layer fabric, and a spacer yarn layer connecting the first surface layer fabric with the second surface layer fabric, both the first surface layer fabric and the second surface layer fabric are bi-dimensional structures having the negative Poisson's ratio effects; the method is to compress and/or stretch a three dimensional mesh spacer knitted base fabric along one or two plane directions to form a structures having the negative Poisson's ratio effects. The advantages of the present application include low making cost, simple operation method, significant negative Poisson's ratio effects, good elastic recovery, and high practical application value.

8 Claims, 5 Drawing Sheets no-stretching state stretching direction stretching state

(51) Int. Cl.
*B32B 5/26* (2006.01)
*B32B 5/02* (2006.01)
*D04B 21/14* (2006.01)
*D04B 21/20* (2006.01)
*D06C 7/00* (2006.01)
*D06C 15/00* (2006.01)

(52) U.S. Cl.
CPC *B32B2262/0261* (2013.01); *B32B 2262/0276* (2013.01); *B32B 2307/54* (2013.01); *D10B 2403/0122* (2013.01); *D10B 2403/021* (2013.01); *Y10T 428/24149* (2015.01); *Y10T 442/10* (2015.04); *Y10T 442/45* (2015.04)

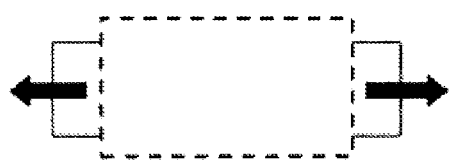
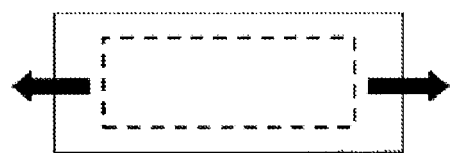
Fig.1a　　　　　　　　　　Fig.1b
Fig.2a　　　　　　　　　　Fig.2b
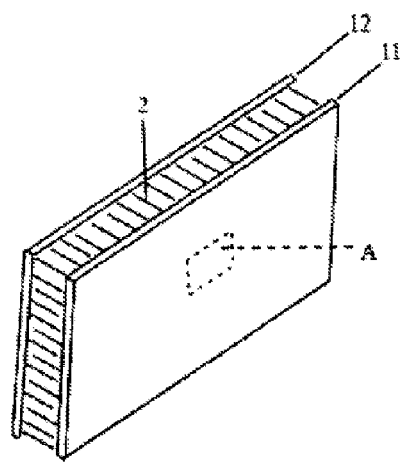
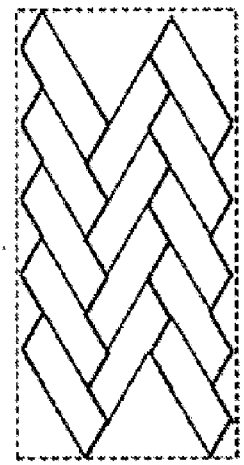
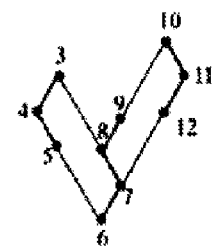
Fig.3a　　　　Fig.3b　　　　Fig.3c

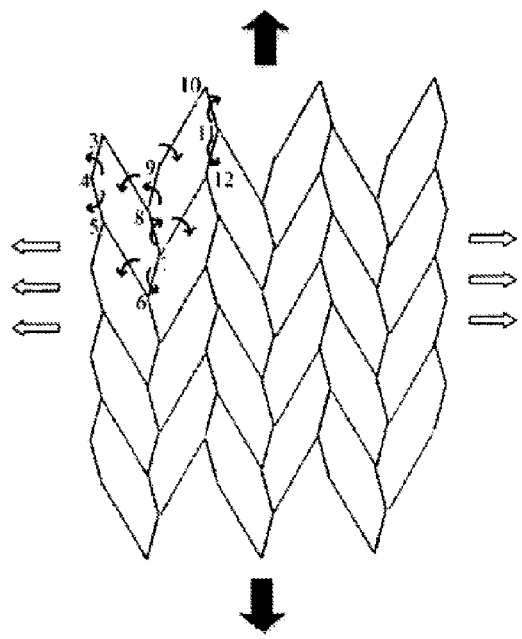
Fig.4
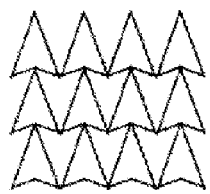         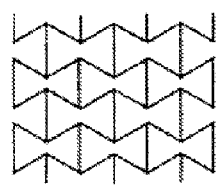         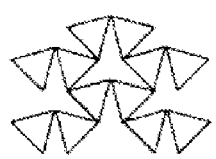         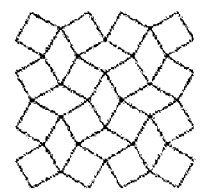
Fig.5a              Fig.5b              Fig.5c              Fig.5d
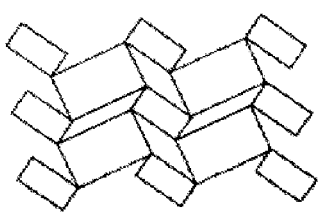              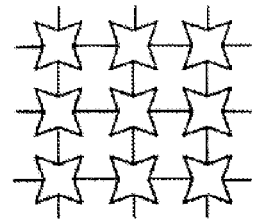              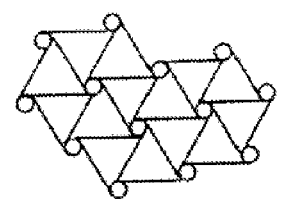
Fig.5e              Fig.5f              Fig.5g

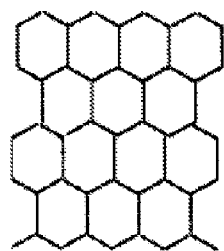 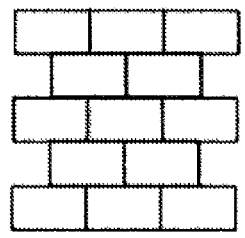 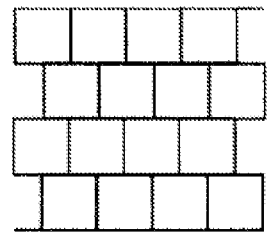
Fig.6a　　　　　　　Fig.6b　　　　　　　Fig.6c
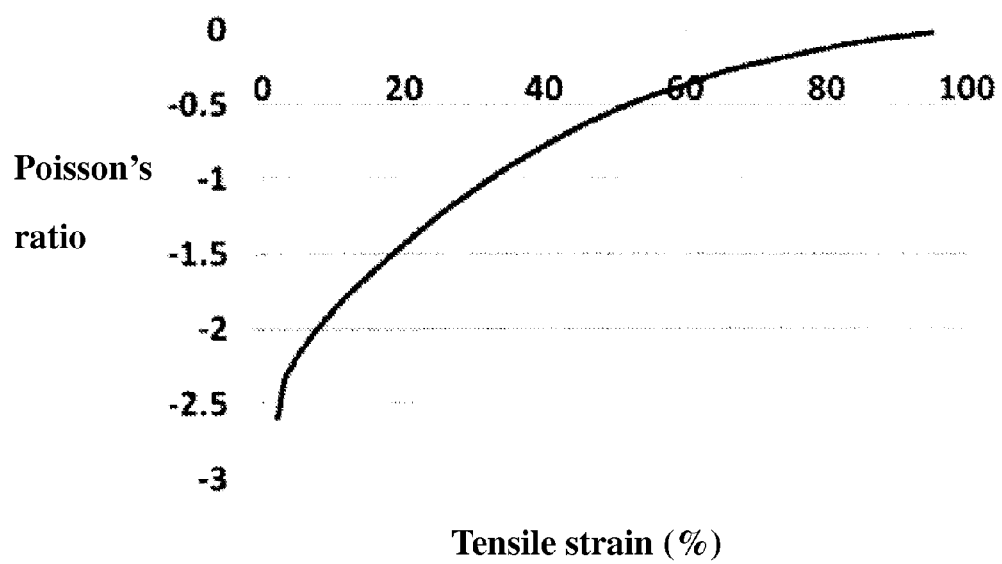
Tensile strain (%)
Fig.7

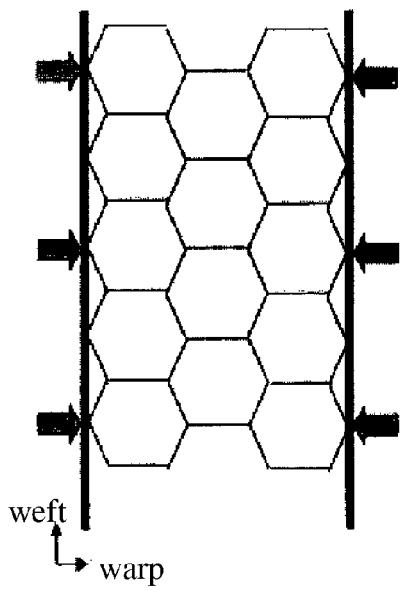
weft
warp
Fig.8a
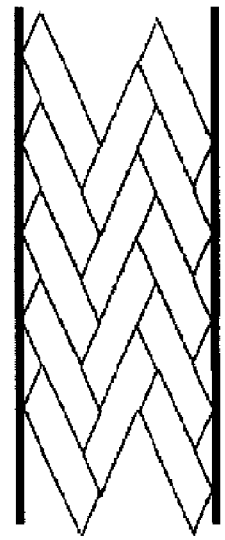
Fig.8b
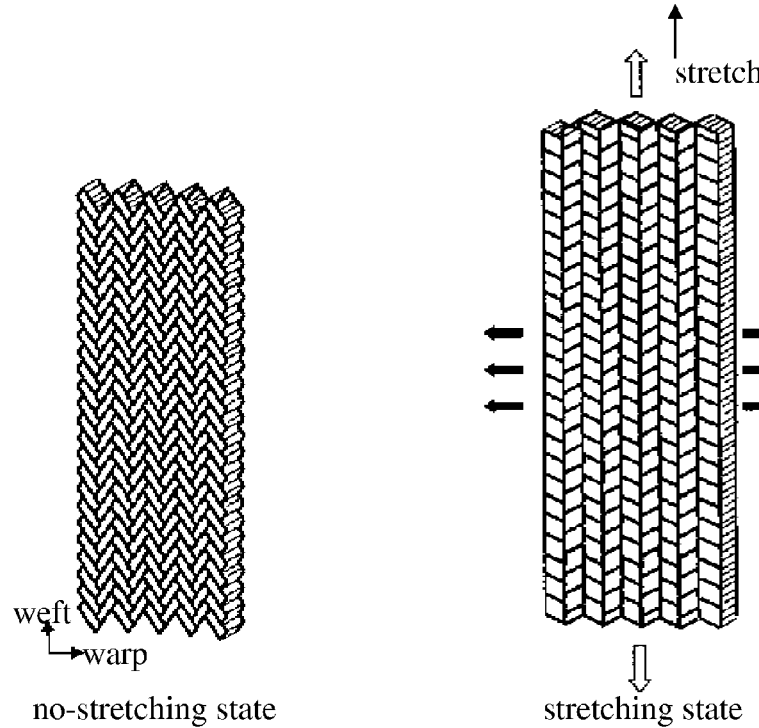
no-stretching state
stretching direction
stretching state
Fig.9a
Fig.9b

THREE DIMENSIONAL NEGATIVE POISSON'S RATIO SPACER KNITTED FABRIC AND METHOD FOR MAKING THE SAME

FIELD OF THE INVENTION

This present invention relates to the field of textile, and more particularly to a three dimensional negative Poisson's ratio spacer knitted fabric and a method for making the same.

BACKGROUND OF THE INVENTION

In daily life, most kinds of material as we know, such as rubber and cloth, have positive Poisson's ratios. When a positive Poisson's ratio material is stretched along one direction, the positive Poisson's ratio material will become thinner along another direction that is perpendicular to the stretching direction (as shown in FIG. 1a). In contrast, a negative Poisson's ratio material behaves in the opposite way. When the negative Poisson's ratio material is stretched along one direction, the negative Poisson's ratio material will become thicker along another direction that is perpendicular to the stretching direction (as shown in FIG. 1b). The negative Poisson's ratio material is rare, but such material has better performance in many aspects than the positive Poisson's ratio material, such as the formation of synclastic curvatures under bending (as shown in FIG. 2a, when the negative Poisson's ratio material positioned in a plane is forced, the negative Poisson's ratio material bends along the same perpendicular direction). In contrast, the positive Poisson's ratio material positioned in a plane is forced to bend along one direction, the positive Poisson's ratio material will further bend along an opposite direction and generate saddle-shaped form (as shown in FIG. 2b). The aforementioned property of the positive Poisson's ratio material restricts its application in the aspect of manufacturing outdoor protective clothes. Since many body structures in a human body are all synclastic bend-shaped, the synclastic curvature property of the negative Poisson's ratio material is very useful. When the negative Poisson's ratio material is applied to kneepieces and elbow guard pieces of a suit of outdoor protective clothes, the negative Poisson's ratio material can bend along the same directions as knees and elbows of a human body and form spherical shapes. Thus, the protective clothes can be more flexible in sports. Furthermore, the negative Poisson's ratio material further has excellent properties of preventing concavity and absorbing energy.

Because of the unique performance of the negative Poisson's ratio material, developments of the negative Poisson's ratio have been one of hot researches in the material field since a synthetic negative Poisson's ratio material was first reported in 1987. In recent years, the negative Poisson's ratio effects realized by textile structures, especially by knitted structures, have gained much attention.

U.S. Pat. No. 20110046715A1 and WO. Pat. No. 2009002479A1 demonstrate a series of warp knitted mesh fabrics. A few kinds of the warp knitted mesh fabrics have the negative Poisson's ratio effects. However, these fabrics have bigger meshwork structures, so that the fabrics can merely be in special use rather than be ordinary fabrics. Moreover, elastic recovery of these fabrics is poor, and the negative Poisson's ratio effects of these fabrics may disappear under the action of repeated stretch. These fabrics are difficult to return to their initial state after deformation, thus these fabrics have low practical value.

WO. Pat. No. 2010125397A1 demonstrates another kind of warp knitted fabric with a negative Poisson's ratio. The fabric is made of two kinds of yarns with differences in modulus. The yarn with the lower modulus is used for the ground stitch, and the yarn with the higher modulus is used as the laid-in yarn. A double arrowhead structure (re-entrant quadrilaterals) is formed on the ground stitch to generate the negative Poisson's ratio effects. This kind of fabric generates the positive Poisson's ratio effects when being stretched along the warp direction or the weft direction. Only this fabric is stretched along a diagonal direction, can it generate lower negative Poisson's ratio effects, and the lower negative Poisson's ratio effects can be realized merely under a lower tensile strain range (lower than 10%).

U.S. Pat. No. 20080011021A1 and WO. Pat. No. 2008016690A2 demonstrate a kind of warp knitted fabric with a negative Poisson's ratio, which is similar to the fabric demonstrated in WO. Pat. No. 2010125397A1. This kind of fabric generates the negative Poisson's ratio effects based on re-entrant quadrilaterals formed by triangle mesh structures, but the negative Poisson's ratio effects are also insignificant.

It can be seen from the above patents that knitted fabrics with negative Poisson's ratios in the prior art are usually knitted based on warp knitted structures by using warp knitting technology. The knitted fabrics with negative Poisson's ratios made by these methods are difficult to knit, and the negative Poisson's ratio effects thereof are neither significant nor stable. Moreover, elastic recovery of the aforementioned fabrics is poor, which restricts the application of these fabrics.

SUMMARY OF THE INVENTION

The object of the present application is to provide a three dimensional negative Poisson's ratio spacer knitted fabric that is simple in making process and has significant and stable negative Poisson's ratio effects and good elastic recovery, and a method for making the same, to solve the problem that the fabrics with negative Poisson's ratios in the prior art are difficult to knit, the negative Poisson's ratio effects thereof are neither significant nor stable, and the elastic recovery thereof is poor.

In order to realize the object mentioned above, this present application relates to a three dimensional negative Poisson's ratio spacer knitted fabric. The three dimensional negative Poisson's ratio spacer knitted fabric includes a first surface layer fabric, a second surface layer fabric, and a spacer yarn layer connecting the first surface layer fabric with the second surface layer fabric; both the first surface layer fabric and the second surface layer fabric are bi-dimensional structures having the negative Poisson's ratio effects.

The first surface layer fabric and second surface layer fabric have many adjoining V-shaped repeated units respectively.

The first surface layer fabric and second surface layer fabric are respectively a re-entrant quadrangle mesh structure, a re-entrant hexagon mesh structure, a rotary triangle mesh structure, a rotary square mesh structure, a rotary rectangle mesh structure, a star honeycombed mesh structure, or a chiral honeycombed mesh structure.

Both the first surface layer fabric and the second surface layer fabric consist of thermoplastic fibers, and the spacer yarn layer is knitted with polyester monofilaments or other chemical fiber monofilaments.

This present application further provides a method, and the method includes:

Step 1, a three dimensional mesh spacer knitted fabric is defined as a base fabric, the base fabric is compressed and/or stretched along a plane direction to make surface layers of the base fabric have negative Poisson's ratio effects;

and Step 2, the surface layer structure of the base fabric keeping the negative Poisson's ratio effects in Step 1 is subjected to a heat setting treatment, and the three dimensional negative Poisson's ratio spacer knitted fabric is obtained.

In Step 1, the three dimensional mesh spacer fabric consists of a first surface layer, a second surface layer, and a spacer yarn layer connecting the first surface layer with the second surface layer; both the first surface layer and the second surface layer are knitted with thermoplastic fibers, and the spacer yarn layer is knitted with polyester monofilaments or other chemical fiber monofilaments.

The thermoplastic fibers are polyester fibers, polyethylene fibers, polypropylene fibers, or polyamide fibers.

In Step 1, a mesh structure of the three dimensional mesh spacer knitted fabric is a hexagon mesh structure, a square mesh structure, or a rectangle mesh structure.

In Step 1, the plane direction includes a warp direction and a weft direction; the base fabric is compressed and/or stretched in the plane direction, that is, the base fabric is compressed in the warp direction or in the weft direction, or is stretched in the warp direction or in the weft direction, or is compressed both in the warp direction and in the weft direction, or is stretched both in the warp direction and in the weft direction, or is compressed in the warp direction and stretched in the weft direction, or is stretched in the warp direction and compressed in the weft direction.

In Step 2, the surface layer structure of the base fabric uses a coating to keep the negative Poisson's ratio effects in Step 1.

By implementing the present application, the following advantages can be achieved: (1) the three dimensional mesh spacer knitted fabric selected in the present application is an ordinary fabric, the cost of the fabric is low and the knitting process of the fabric is ripe, so that the cost of the present application is convenient to be controlled; (2) the making method of the present application merely relates to compressing treatment, stretching treatment, and heat setting process, which are simple to operate and easy to realize; (3) the negative Poisson's ratio effects of the three dimensional negative Poisson's ratio spacer knitted fabric of the present application is significant and can achieve −2~5, and when the tensile strain value reaches 95%, the fabric still has the negative Poisson's ratio effects; (4) the elastic recovery of the three dimensional negative Poisson's ratio spacer knitted fabric of the present application is good, and the fabric can still return to the initial shape and keep the negative Poisson's ratio effects after being stretched for many times.

BRIEF DESCRIPTION OF THE DRAWINGS

FIG. 1a is a schematic view of stretching a positive Poisson's ratio material, wherein the dotted box represents a contour before stretching, and the solid box represents a contour after stretching.

FIG. 1b is a schematic view of stretching a negative Poisson's ratio material, wherein the dotted box represents a contour before stretching, and the solid box represents a contour after stretching.

FIG. 2a is a schematic view of bending the negative Poisson's ratio material.

FIG. 2b is a schematic view of bending the positive Poisson's ratio material.

FIG. 3a is a schematic view of a three dimensional negative Poisson's ratio spacer knitted fabric of the present application.

FIG. 3b is an enlarged view of the Part A shown in FIG. 3a.

FIG. 3c is a schematic view of repeated units of a surface layer structure of the three dimensional negative Poisson's ratio spacer knitted fabric of the present application.

FIG. 4 is a deformation view of the three dimensional negative Poisson's ratio spacer knitted fabric of the present application in a stretching state.

FIG. 5a is a schematic view of a surface layer structure of a re-entrant quadrangle mesh structure of the three dimensional negative Poisson's ratio spacer knitted fabric of the present application.

FIG. 5b is a schematic view of a surface layer structure of a re-entrant hexagon mesh structure of the three dimensional negative Poisson's ratio spacer knitted fabric of the present application.

FIG. 5c is a schematic view of a surface layer structure of a re-entrant triangle mesh structure of the three dimensional negative Poisson's ratio spacer knitted fabric of the present application.

FIG. 5d is a schematic view of a surface layer structure of a rotary quadrangle mesh structure of the three dimensional negative Poisson's ratio spacer knitted fabric of the present application.

FIG. 5e is a schematic view of a surface layer structure of a rotary rectangle mesh structure of the three dimensional negative Poisson's ratio spacer knitted fabric of the present application.

FIG. 5f is a schematic view of a surface layer structure of a star honeycombed mesh structure of the three dimensional negative Poisson's ratio spacer knitted fabric of the present application.

FIG. 5g is a schematic view of a surface layer structure of a chiral honeycombed mesh structure of the three dimensional negative Poisson's ratio spacer knitted fabric of the present application.

FIG. 6a is a schematic view of a hexagon mesh structure of a three dimensional mesh spacer knitted fabric of the present application.

FIG. 6b is a schematic view of a rectangle mesh structure of the three dimensional mesh spacer knitted fabric of the present application.

FIG. 6c is a schematic view of a square mesh structure of the three dimensional mesh spacer knitted fabric of the present application.

FIG. 7 is a curve that demonstrates the negative Poisson's ratio of the three dimensional negative Poisson's ratio spacer knitted fabric of the present application changing with tensile strains.

FIG. 8a is a schematic view of a surface layer structure of a hexagon mesh structure of the three dimensional mesh spacer knitted fabric of the present application before being compressed.

FIG. 8b is a schematic view of a surface layer structure of a hexagon mesh structure of the three dimensional mesh spacer knitted fabric of the present application after being compressed.

FIG. 9a is a schematic view of the three dimensional negative Poisson's ratio spacer knitted fabric of the present application in a no-stretching state.

FIG. 9*b* is a schematic view of the three dimensional negative Poisson's ratio spacer knitted fabric of the present application in a stretching state.

DETAILED DESCRIPTION OF THE PREFERRED EMBODIMENT

Figure 10A:
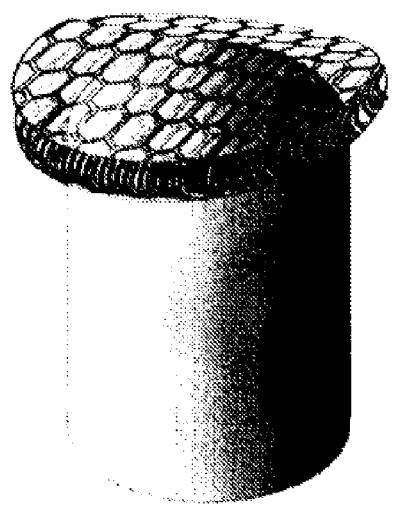
FIG. 10*a* is a schematic view of a shape-adaptability of a three dimensional positive Poisson's ratio spacer knitted fabric.

In order to understand the technical features, the purpose and the effect of the present application more clearly, the specific embodiments of the present application will be described in detail referring to the drawings. It is understandable that the specific embodiments are merely an explanation rather than a limit.

Directions in the present application are defined according to the rules as follows: in a plane, a direction that is parallel to a vertical direction of a knitted fabric is defined as a weft direction, and a direction that is perpendicular to the vertical direction of the knitted fabric is defined as a warp direction.

In a preferred embodiment, a method for making a three dimensional negative Poisson's ratio spacer knitted fabric includes the following steps.

Step 1: knitting a three dimensional mesh spacer knitted fabric.

By adopting polyester multifilament as yarn for two surface fabric layers and polyester monofilament as yarn for a spacer yarn layer, a three dimensional mesh spacer knitted fabric as shown in FIG. 8*a* is knitted by warp knitting process of three dimensional mesh spacer knitted fabrics in the prior art. The three dimensional mesh spacer knitted fabric is used as a base fabric for making the three dimensional negative Poisson's ratio spacer knitted fabric. The three dimensional negative Poisson's ratio spacer knitted fabric includes a first surface layer, a second surface layer, and a spacer yarn layer connecting the first surface layer with the second surface layer. Referring to FIG. 8*a*, the first surface layer and the second surface layer of the three dimensional mesh spacer fabric of the preferred embodiment have a hexagon mesh structure. A thickness of the base fabric made by Step 1 is 7.88 mm. In each hexagon mesh of the hexagon mesh structure of the first surface layer and the second surface layer, a length of each of two long sides of the hexagon mesh, which are parallel to the warp direction, is 5.84 mm; and a length of each of the other four short sides of the hexagon mesh is 2.48 mm.

Step 2: making the surface layer structure of the base fabric have negative Poisson's ratio effects.

The base fabric is compressed along the warp direction of the base fabric. Because of structural features and edge effects of the surface layer of the base fabric, the structure of the surface layers of the base fabric changes. The hexagon mesh structure turns to be another mesh structure formed by parallelogram meshes, as shown in FIG. 8*b*, and every two adjacent parallelogram meshes further form the smallest V-shaped repeated units. This kind of mesh structure has the negative Poisson's ratio effects.

FIG. 8*b* shows the surface layer structure of the base fabric with the negative Poisson's ratio effects. Also referring to FIG. 3*c*, in the base fabric, each of the V-shaped repeated units includes a first line segment 3-4, a second line segment 4-5, a third line segment 5-6, a fourth line segment 6-7, a fifth line segment 7-12, a sixth line segment 11-12, a seventh line segment 10-11, an eighth line segment 9-10, a ninth line segment 8-9, a tenth line segment 7-8, and a eleventh line segment 3-8. Lengths of the first line segment 3-4, the second line segment 4-5, the fourth line segment 6-7, the sixth line segment 11-12, the seventh line segment 10-11, the ninth line segment 8-9, and the tenth line segment 7-8 are equal to each other; lengths of the other line segments (i.e., the third line segment 5-6, the fifth line segment 7-12, the eighth line segment 9-10, and the eleventh line segment 3-8) are equal to each other. Further, the first line segment 3-4, the fourth line segment 6-7, the sixth line segment 11-12, and the ninth line segment 8-9 are parallel to each other; the second line segment 4-5, the tenth line segment 7-8, and the seventh line segment 10-11 are parallel to each other; the third line 5-6 segment is parallel to the eleventh line segment 3-8; and the fifth line segment 7-12 is parallel to the eighth line segment 9-10. Referring to FIG. 4, when the fabric with such surface layer structure is compressed (or stretched) along one direction, by turning, bending, and elongating the aforementioned line segments, the size of the surface layer structure of the fabric decreases (or increases) along another direction that is perpendicular to the compressing (or stretching direction), so that the required negative Poisson's ratio effects are realized.

Step 3: a heat setting treatment for the fabric with the negative Poisson's ratio effects.

After obtaining the base fabric with the negative Poisson's ratio effects as shown in FIG. 8*b* by means of compressing the base fabric along the warp direction thereof, the fabric is subjected to a heat setting treatment. In the heat setting treatment, the setting time is 5 min, and the setting temperature is 200° C. In this way, the three dimensional negative Poisson's ratio spacer knitted fabric as shown in FIG. 3*a* can be obtained.

It can be clearly seen from FIG. 3*a* that the three dimensional negative Poisson's ratio spacer knitted fabric includes a first surface layer fabric 11, a second surface layer fabric 12, and a spacer yarn layer 2 connecting the first surface layer fabric 11 with the second surface layer fabric 12. Both the first surface layer fabric 11 and the second surface layer fabric 12 have the negative Poisson's ratio effects (as shown in FIG. 3*b*, which is an enlarged view of the Part A shown in FIG. 3*a*).

As detailed above, the negative Poisson's ratio material has different properties from the positive Poisson's ratio material, such as the formation of synclastic curvatures under bending, etc. Thus, the three dimensional negative Poisson's ratio spacer knitted fabric made by the method of the preferred embodiment of the present application is conducted a tensile test and a shape-adaptability test to verify the negative Poisson's ratio effects thereof.

Referring to FIG. 9*a* and FIG. 9*b*, FIG. 9*a* is a schematic view of the three dimensional negative Poisson's ratio spacer knitted fabric of the present application in a no-stretching state, and FIG. 9*b* is a schematic view of the three dimensional negative Poisson's ratio spacer knitted fabric of the present application in a stretching state. It can be clearly seen from FIG. 9*a* and FIG. 9*b* that when the fabric is stretched along a weft direction, the fabric becomes wider along another direction that is perpendicular to the stretching direction, which shows obvious negative Poisson's ratio effects. The fabric is tested about the negative Poisson's ratio effects under different tensile degrees, and a change curve of the negative Poisson's ratio effects of the fabric, as shown in FIG. 7, is formed. The fabric is tested by the method in the article entitled "Development of Auxetic Fabrics Using Flat Knitting Technology" (Hong Hu et al., Textil Research Journal, 2011, 81 (14), 1493-1502), and the test instrument adopted is an Instron tensile instrument.

Figure 10B:
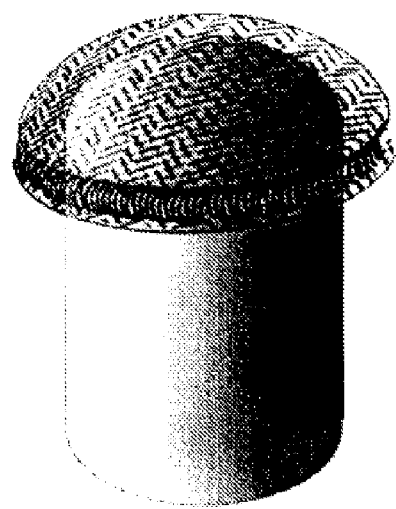
FIG. 10*b* is a schematic view of a shape-adaptability of a three dimensional negative Poisson's ratio spacer knitted fabric.

Both the three dimensional negative Poisson's ratio spacer knitted fabric of the preferred embodiment of the present application and a three dimensional positive Poisson's ratio spacer knitted fabric in the prior art can be put on an object with a certain curvature to observe the shape-adaptabilities of the two fabrics. It can be seen from FIG. 10a and FIG. 10b that the three dimensional positive Poisson's ratio spacer knitted fabric generates approximate saddle-shaped effects, that is, an edge of the fabric drops, and a final shape of the fabric is not consistent with the curvature of the object. However, the three dimensional negative Poisson's ratio spacer knitted fabric has a better shape-adaptability, and the shape of the fabric is finally adaptive to the curvature of the object.

Because both the first surface layer fabric and the second surface layer fabric have the negative Poisson's ratio effects, the three dimensional negative Poisson's ratio spacer knitted fabric made by the method of the preferred embodiment has the same significant negative Poisson's ratio effects and a better shape-adaptability.

In addition to the method of the preferred embodiment, if the three dimensional mesh spacer knitted fabric is compressed along a weft direction, or stretched along the warp direction or the weft direction, or compressed along both the warp direction and the weft direction, or stretched along both the warp direction and the weft direction, or compressed along the warp direction and stretched along the weft direction, or stretched along the warp direction and compressed along the weft direction, the surface layer structure of the three dimensional mesh spacer knitted fabric can also be changed to form other surface layer structures with the negative Poisson's ratio effects.

In the present application, In addition to the base fabric with the hexagon mesh structure as shown in FIG. 8a, a base fabric with a square mesh structure or a base fabric with a rectangle mesh structure can also be used. It is understandable that those skilled in the art may use any kind of base fabric with a mesh structure according to actual needs, as long as the base fabric can form a mesh structure with the negative Poisson's ratio effects after being compressed or stretched.

In addition, besides the aforementioned surface layer structure based on the V-shaped repeated units, in the present application, the surface layer structure with the negative Poisson's ratio effects can also be a re-entrant quadrangle mesh structure (as shown in FIG. 5a), an re-entrant hexagon mesh structure (as shown in FIG. 5b), a rotary triangle mesh structure (as shown in FIG. 5c), a rotary square mesh structure (as shown in FIG. 5d), a rotary rectangle mesh structure (as shown in FIG. 5e), a star honeycombed mesh structure (as shown in FIG. 5f), or a chiral honeycombed mesh structure (as shown in FIG. 5g).

In addition, the material for knitting the first surface layer fabric and the second surface layer fabric in the present application is not limited to the polyester multifilament. Those skilled in the art can choose any other suitable thermoplastic fiber according to actual needs, such as polyester fiber, polyethylene fiber, polypropylene fiber, polyamide fiber, etc. The material for knitting the spacer yarn layer in the present application can be other kinds of chemical fiber monofilament besides the polyester monofilament.

In the present application, the first surface layer fabric may have the same surface layer structure as the second surface layer fabric or have a different surface layer structure from the second surface layer fabric, and may also have a symmetric surface layer structure or an asymmetric surface layer structure with the second surface layer fabric. It is understandable that, because the surface layer structure with the negative Poisson's ratio effects is not unique, the surface layer structures of both the first surface layer fabric and the second surface layer fabric can have a plurality of choices.

In addition, the base fabric after being compressed or stretched can be kept in a compressed or stretched state with the negative Poisson's ratio effects by a coating. For example, the coating can adopt polyurethane, but is not limited to polyurethane. The coating can also adopt a painting such as epoxy resins, phenolic resins, urea resins, organic silicon resins, unsaturated polyester, acrylic resins, cellulose ester, alkene compounds, polyester, polyether, polyamide, polyacrylamide, polyvinyl chloride, natural rubber, and synthetic rubber (e.g., neoprene and styrene-butadiene rubber). Two surface layers of the spacer fabric are operated by a coating process such as spraying, brush coating, and roller coating, with a suitable operating viscosity, and then the coating is consolidated at room temperature or by heating. The consolidated coating can keep the spacer fabric in a state with the negative Poisson's ratio effects. When coating, the painting is merely painted on a surface of the yarn, and original gaps in the fabric are maintained. The present application does not limit the operating viscosity in the coating process and the consolidation temperature in the consolidation process.

In conclusion, the method of the present application for making the three dimensional negative Poisson's ratio spacer knitted fabric has the advantages of low cost and simple operation. The negative Poisson's ratio effects of the three dimensional negative Poisson's ratio spacer knitted fabric of the present application is significant, and the elastic recovery of the fabric is good. The fabric can be used for making kneepieces and elbow guard pieces of outdoor protective clothes, and the practical application value is high.

The invention claimed is:

1. A three dimensional negative Poisson's ratio spacer knitted fabric, wherein, the three dimensional negative Poisson's ratio spacer knitted fabric includes a first surface layer fabric, a second surface layer fabric, and a spacer yarn layer connecting the first surface layer fabric with the second surface layer fabric, and both the first surface layer fabric and the second surface layer fabric are surface structures having the negative Poisson's ratio effects;

each of the first surface layer fabric and second surface layer fabric is any one of a re-entrant quadrangle mesh structure, a re-entrant hexagon mesh structure, a rotary triangle mesh structure, a rotary square mesh structure, a rotary rectangle mesh structure, a star honeycombed mesh structure, or a chiral honeycombed mesh structure.

2. The three dimensional negative Poisson's ratio spacer knitted fabric of claim 1, wherein, each of the first surface layer fabric and second surface layer fabric has a plurality of adjoining V-shaped repeated units.

3. The three dimensional negative Poisson's ratio spacer knitted fabric of claim 1, wherein, both the first surface layer fabric and the second surface layer fabric are formed by thermoplastic fibers, and the spacer yarn layer is formed by polyester monofilaments or other chemical fiber monofilaments.

4. A method for making the three dimensional negative Poisson's ratio spacer knitted fabric, wherein, the method includes: Step 1, a three dimensional mesh spacer knitted fabric is defined as a base fabric, and the base fabric is compressed and/or stretched along a plane direction to make surface layers of the base fabric have negative Poisson's ratio effects; Step 2, the surface layer structure of the base fabric keeping the negative Poisson's ratio effects in Step 1 is subjected to a heat setting treatment, and the three dimensional negative Poisson's ratio spacer knitted fabric is obtained;

wherein, in Step 1, the three dimensional mesh spacer fabric includes a first surface layer, a second surface layer, and a spacer yarn layer connecting the first surface layer with the second surface layer;

each of the first surface layer fabric and second surface layer fabric is any one of a re-entrant quadrangle mesh structure, a re-entrant hexagon mesh structure, a rotary triangle mesh structure, a rotary square mesh structure, a rotary rectangle mesh structure, a star honeycombed mesh structure, or a chiral honeycombed mesh structure.

5. The method for making the three dimensional negative Poisson's ratio spacer knitted fabric of claim 4, wherein, in Step 1, both the first surface layer and the second surface layer are knitted with thermoplastic fibers, and the spacer yarn layer is knitted with polyester monofilaments or other chemical fiber monofilaments.

6. The method for making the three dimensional negative Poisson's ratio spacer knitted fabric of claim 5, wherein, the thermoplastic fibers are any one kind of polyester fibers, polyethylene fibers, polypropylene fibers, or polyamide fibers.

7. The method for making the three dimensional negative Poisson's ratio spacer knitted fabric of claim 4, wherein, in Step 1, the plane direction includes a warp direction and a weft direction; and that the base fabric is compressed and/or stretched along the plane direction includes: the base fabric is compressed along the warp direction or the weft direction, or is stretched along the warp direction or the weft direction, or is compressed along both the warp direction and the weft direction, or is stretched along both the warp direction and the weft direction, or is compressed along the warp direction and stretched along the weft direction, or is stretched along the warp direction and compressed along the weft direction.

8. The method for making the three dimensional negative Poisson's ratio spacer knitted fabric of claim 4, wherein, in Step 2, the surface layer structure of the base fabric is enabled to keep the negative Poisson's ratio effects in Step 1 by a coating.

* * * * *